No. 642,145. Patented Jan. 30, 1900.
T. E. MOON.
ADJUSTABLE RIDING ATTACHMENT FOR PLOWS.
(Application filed June 9, 1899.)
(No Model.)

Witnesses
Inventor
Thomas E. Moon
By ........ Attorney

THE NORRIS PETERS CO., PHOTO-LITHO., WASHINGTON, D. C.

UNITED STATES PATENT OFFICE.

THOMAS ELWOOD MOON, OF SABINA, OHIO.

ADJUSTABLE RIDING ATTACHMENT FOR PLOWS.

SPECIFICATION forming part of Letters Patent No. 642,145, dated January 30, 1900.

Application filed June 9, 1899. Serial No. 719,875. (No model.)

*To all whom it may concern:*

Be it known that I, THOMAS ELWOOD MOON, a citizen of the United States, residing at Sabina, in the county of Clinton and State of Ohio, have invented certain new and useful Improvements in Adjustable Riding Attachments for Plows; and I do hereby declare the following to be a full, clear, and exact description of the invention, such as will enable others skilled in the art to which it appertains to make and use the same.

My invention relates to riding attachments for plows, and has for its object to provide an adjustable riding attachment that can be readily combined with any common walking-plow and which shall be of light weight, so as to be easily handled in operation, and upon which the operator can ride and control the plow in the usual manner, the construction being such that the operator may walk when he desires and at the same time have facilities for handling the plow in the usual manner. The difficulty with improvements of this character as heretofore ordinarily constructed has been that while they possessed sufficient strength they were of such form as to be difficult to handle and of too great weight to be practicable.

Other objects of my invention are to overcome these difficulties by providing a framework especially adapted to such uses and which can be made of light material and may yet have sufficient strength.

The invention will first be hereinafter more particularly described with reference to the accompanying drawings, which form a part of this specification, and then pointed out in the claims at the end of the description.

Figure 1:
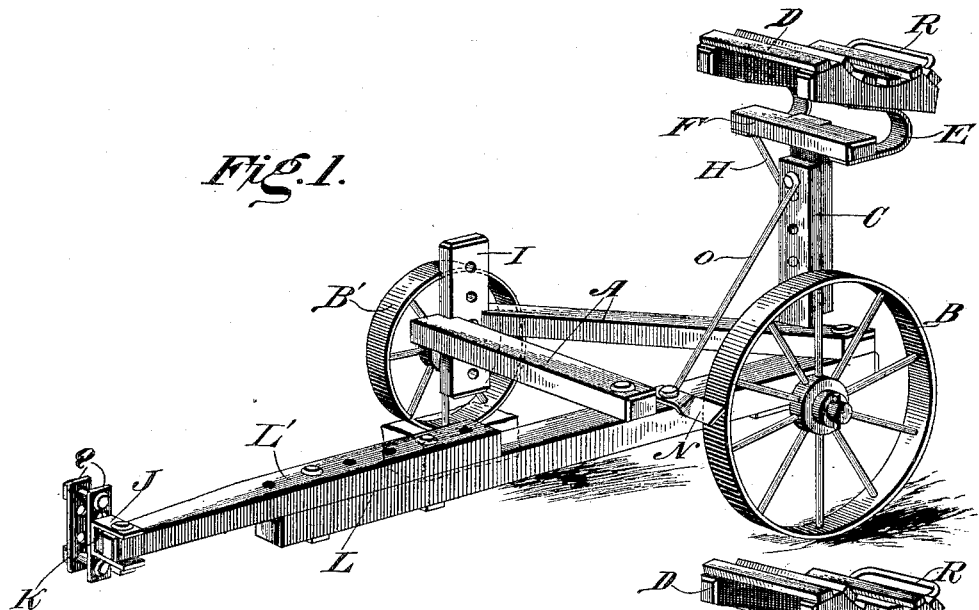
Figure 2:
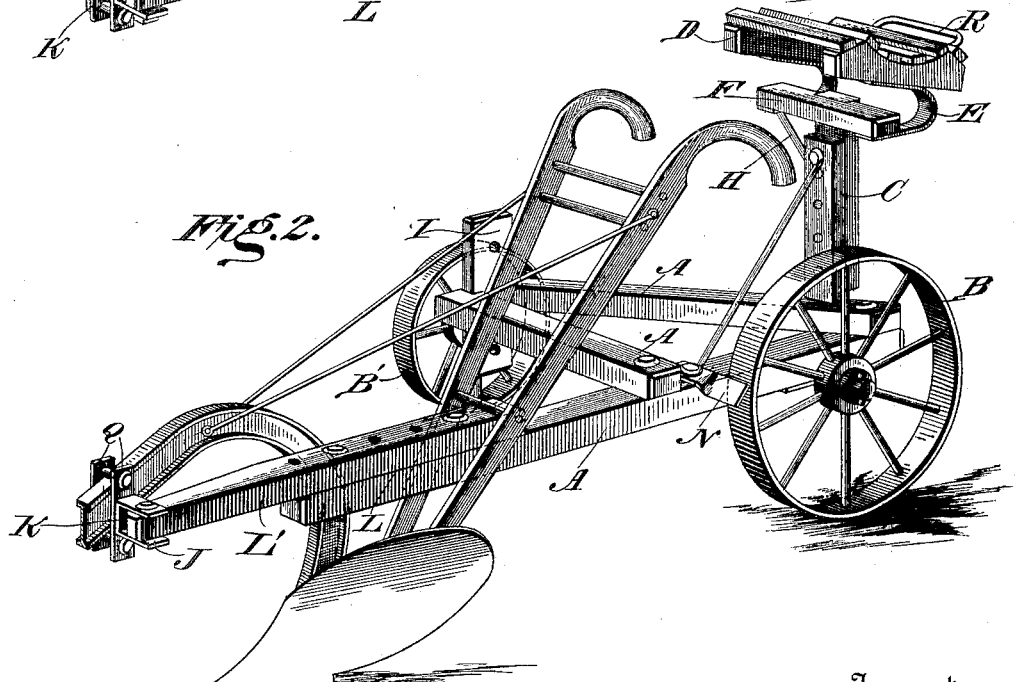

In the drawings, Figure 1 is a perspective view of a riding attachment embodying my invention. Fig. 2 is a perspective view of the attachment combined with a walking-plow.

A denotes a triangular frame having one side thereof formed of two parts L L', extending forward of the frame proper and bolted together in such manner as to form an adjustable tongue or draft-bar by which the attachment may be coupled to the beam of the plow. By means of the adjustable part L' having a series of perforations therein to receive the fastening-bolts the attachment may be connected to plows having handles of various lengths and extending a greater or less distance from the place of coupling, which preferably is close in front of the connection of the beam with the body or moldboard of the plow, and the handles in either case may be arranged at a convenient point for manipulation by lengthening or shortening the tongue L L', as may be desired. The frame A is mounted upon two wheels B B' in such manner that the larger wheel B is at the rearmost part of the frame and falls directly behind the plow in the furrow, while the smaller wheel B' is at the right-hand forward part of the triangular frame and runs on the land side of the furrow. By this peculiar construction strength is added to the light framework of the device and also advantage is gained by placing the land-wheel B' forward of the larger wheel B, which latter is designed to carry the weight of the operator mostly, so that he can have easy access to the seat D in mounting and dismounting while in operation. It also affords room and convenience for the operator to walk behind the attachment when he desires and control the plow in the usual manner and to handle the plow and attachment while turning at corners. In making right-angle turns at corners the operator grasps the right-hand handle of the plow with his right hand and the handle R on the seat D with his left hand, lifting them both forward, causing the plow to rest on the point or nose, thus forming a pivot upon which the plow turns while the beam swings around to the proper position.

C is a vertical seat-post consisting of two parts, bolted together in such manner that it can be extended or shortened for the purpose of adjusting the seat to suit the operator, one of said parts being provided with a series of perforations to receive the fastening bolt or bolts and permit of the vertical adjustment of the seat in a manner well known in the art.

D is a seat fastened to the springs E, which are bolted to the top part F of the seat-post. A short brace H supports the cross part of the seat-post C. A brace O extends from the top of the stationary part of the seat-post downward to the frame, and it is held in place by a bolt, which also holds in place the scraper N, which prevents the soil from accumulating on the wheel B.

I is a short block bolted vertically to the forward corner of the frame, to which the land-wheel B' is attached by a series of holes for the fastening bolt or bolts, so that said wheel can be raised or lowered according to the depth of the furrow.

Q is a clamp consisting of two parts provided with a series of holes, through which bolts may pass, so as to adapt the attachment to be fastened to plows with different widths of beam.

J is a clevis fastened loosely to one of the parts of the clamp Q by a rivet K, which admits of the device being lifted up and by which the attachment adapts itself to the unevenness of the ground in following the plow. It also enables the operator to govern the depth of the plow by the elevation or depression of the handles. The open end of the clevis being forward receives the forward end of the tongue, through which a pin passes loosely, thus forming a connection which admits of the device being oscillated to right or left in making the runs and also enables the operator to control the plow in cutting more or less land, as desired.

The operation and advantages of my improvement will be readily understood from the foregoing description, taken in connection with the accompanying drawings. As will be seen, the attachment consists of few parts and may be made very light, so as to be easily handled, and by means of the extensible tongue it can be readily attached to any ordinary plow with the handles thereof extending upwardly into convenient position for manipulation by the driver, mounted on the seat at the rear of the triangular frame. It will also be observed that the rear frame-bar, which is arranged at an acute angle to the other two bars forming the triangle, also serves as a diagonal brace for the front frame-bar, which latter preferably extends from the side frame-bar across the line of draft substantially at right angles to said side bar, while the rear bar extends from said side bar at an acute angle thereto to the point of intersection or union with said front bar. The land-wheel, which is arranged at the angle of the frame formed at the intersection of the front and rear bars, is made adjustable vertically, so that it may be raised or lowered according to the depth of furrow, in order to keep the seat and attachment level or parallel with the bottom of the furrow and prevent the same from becoming inclined or liable to tip over. Furthermore, as will be observed, by means of the series of perforations in the two-part clamp for attachment to the beam of the plow a ready means is afforded for securing the attachment of beams of different widths, as when made of iron the beams are usually narrower than when made of wood. By means of the pivotal connections between the clamp, clevis, and beam, the axes of said pivots being arranged at an angle to each other, as shown, the riding attachment is adapted to oscillate or swing laterally, as well as rise and fall vertically, so as to give the desired freedom of movement in operation, as is necessary when the attachment is following the plow over uneven ground and also for the purpose of permitting the rider to control the width of furrow by swinging the handles of the plow to the right or left, as may be desired.

Having thus fully described my invention, what I claim as new, and desire to secure by Letters Patent of the United States, is—

1. A riding attachment for plows, comprising a triangular frame having a frame-bar forming one side of the triangle arranged in the line of draft, and provided with a forward extension or tongue, together with a front and rear frame-bar forming the other two sides of the triangle extending laterally from said side bar and joined together at a suitable distance therefrom; the rear bar being arranged at an acute angle to said side and front bars and intersecting the latter so as to serve as a diagonal brace therefor, a furrow-wheel journaled to said frame between the divergent ends of said front and rear frame-bars, a land-wheel journaled at the intersection of said front and rear bars, in advance of said furrow-wheel, a seat mounted on said frame, and means for connecting said tongue with a common plow.

2. A riding attachment for plows, comprising a triangular frame having a frame-bar forming one side of the triangle arranged in the line of draft, and provided with a forward extension or tongue, together with a front and rear frame-bar forming the other two sides of the triangle extending laterally from said side bar and joined together at a suitable distance therefrom; the rear bar being arranged at an acute angle to said side and front bars and intersecting the latter so as to serve as a diagonal brace therefor, a furrow-wheel journaled to said frame between the divergent ends of said front and rear frame-bars, a vertically-adjustable land-wheel journaled at the intersection of said front and rear bars, in advance of said furrow-wheel, a seat mounted on said frame, and means for connecting said tongue with a common plow.

3. A riding attachment for plows, comprising a triangular frame having a frame-bar forming one side of the triangle arranged in the line of draft, and provided with a forward extension or tongue, together with a front and rear frame-bar forming the other two sides of the triangle extending laterally from said side bar and joined together at a suitable distance therefrom; the rear bar being arranged at an acute angle to said side and front bars and intersecting the latter so as to serve as a diagonal brace therefor, a furrow-wheel journaled to said frame between the divergent ends of said front and rear frame-bars, a land-wheel journaled at the intersection of said front and rear bars, in advance of said furrow-wheel, a seat mounted on said frame, and means for connecting said tongue with a common plow so as to permit vertical and lateral, or oscillatory movement of the riding attachment.

4. A riding attachment for plows, comprising a triangular frame having a frame-bar forming one side of the triangle arranged in the line of draft, and provided with an extensible tongue, together with a front and rear frame-bar forming the other two sides of the triangle extending laterally from said side bar and joined together at a suitable distance therefrom; the rear bar being arranged at an acute angle to said side and front bars and intersecting the latter so as to serve as a diagonal brace therefor, a furrow-wheel journaled to said frame between the divergent ends of said front and rear frame-bars, a land-wheel journaled at the intersection of said front and rear bars, in advance of said furrow-wheel, a seat mounted on said frame, and means for connecting said tongue with a common plow.

5. In combination with an ordinary walking-plow, a detachable riding attachment therefor consisting of a triangular frame mounted upon two wheels, one large and the other comparatively small, the larger wheel being journaled at one side of the triangle and the smaller wheel at the angle thereof formed at the intersection of two of its sides, forward of the larger wheel; said frame being provided with a tongue or draft-bar for attachment to said plow, and having a seat mounted thereon, and said tongue being a continuation or extension of one of the frame-bars forming one side of said triangle, at the furrow-wheel side of the plow, substantially as described.

6. In combination with an ordinary walking-plow having suitable handles, an adjustable riding attachment therefor consisting of a triangular frame mounted upon two wheels, one large, the other comparatively small, the larger wheel being journaled at one side of the triangle and the smaller wheel at the angle thereof formed at the intersection of two of its sides, forward of the larger wheel, said frame having a tongue or draft-bar which is a continuation or extension of one of said frame-bars, forming one side of the triangle at the furrow-wheel side of the plow, and adapted for attachment to the beam of said plow, a seat mounted on said frame, and means for adjusting said smaller wheel vertically, substantially as described.

7. A detachable riding attachment for an ordinary walking-plow, consisting of a triangular frame having a side bar extending in the line of draft at the furrow-wheel side of the plow, and forming one side of the triangular frame; said side bar being provided with a forward extension or tongue, front and rear frame-bars extending from said side bar across the line of draft; said rear bar being arranged at an acute angle to the other two bars, so as to intersect the front bar at one side of the frame and serve as a diagonal brace therefor, a land-wheel journaled in said frame at the point of intersection of said front and rear bars, and a furrow-wheel journaled at the other side of the frame rearwardly of said land-wheel, together with a seat mounted at the rear of the frame, and means for connecting said tongue to the beam of said plow.

8. In combination with an ordinary walking-plow, having suitable rearwardly-extending handles, a riding attachment therefor consisting of a triangular frame having a tongue or draft-bar at one side thereof forming one side of the triangle, and extending forwardly therefrom in the line of draft, a furrow-wheel journaled at said side, a smaller vertically-adjustable land-wheel journaled at the junction of two sides of the triangle, in advance of said furrow-wheel, a seat mounted on said frame rearwardly of said land-wheel, and means for connecting said tongue to the beam of the plow so as to permit a rising-and-falling and a laterally-swinging movement of the riding attachment, substantially as described.

9. The combination with an ordinary walking-plow, of a detachable riding attachment consisting of a triangular frame mounted on wheels, a seat on said frame, and an extensible tongue or draft-bar extending forwardly from and forming one side of said frame for connection with the beam of the plow; the furrow-wheel being journaled to said extensible draft-bar and the land-wheel at the opposite side of the frame at the junction of two sides of the triangle, whereby the attachment is adapted to be connected to plows of different lengths in position for convenient manipulation of the plow by the operator mounted on said seat, substantially as described.

10. In combination with the riding attachment for plows having a tongue or draft-bar extending therefrom, the clevis pivotally secured to said draft-bar and the clamp pivotally secured to said clevis, the axes of said pivots being arranged at an angle to each other so as to permit vertical and lateral or oscillating motion of the riding attachment.

11. In combination with the wheeled frame having the forward extension or tongue, the clamp consisting of two parts provided with a series of holes to receive the fastening-bolts by which it may be secured to beams of different widths; one of said parts being pivotally secured to a clevis, and the latter pivotally secured to said tongue, so as to permit a swinging, or oscillatory, and also vertical movement of the riding attachment.

In testimony whereof I affix my signature in the presence of two witnesses.

THOMAS ELWOOD MOON.

Witnesses:
  JOHN W. MOORE,
  S. P. HAINES.